United States Patent [19]

Vyprachticky

[11] 3,987,899
[45] Oct. 26, 1976

[54] DISPOSABLE THERMOMETER CAP AND METHOD OF MAKING SAME

[75] Inventor: Emil Vyprachticky, Arvada, Colo.

[73] Assignee: Edwin L. Spangler, Jr., Denver, Colo. ; a part interest

[22] Filed: Apr. 25, 1975

[21] Appl. No.: 571,522

[52] U.S. Cl. .............................. 206/306; 73/362 AR
[51] Int. Cl.² ..................... B65D 85/20; G01K 1/08
[58] Field of Search ................... 206/306, 212, 63.3; 73/362 AR

[56] References Cited
UNITED STATES PATENTS

| | | | |
|---|---|---|---|
| 1,919,811 | 7/1933 | Stonebraker | 206/306 |
| 2,313,031 | 3/1943 | Parkhurst | 215/1 C |
| 3,809,229 | 5/1974 | Wahlig | 206/306 |
| 3,880,282 | 4/1975 | Naumann | 206/306 |

Primary Examiner—William T. Dixson, Jr.
Attorney, Agent, or Firm—Edwin L. Spangler, Jr.

[57] ABSTRACT

This invention relates to a disposable molded plastic cap for covering as well as transferring heat to the heat-responsive probe of an electronic thermometer that is characterized by a small highly localized area in the tip that is extremely thin and is placed in heat exchange relation to the heat sensor of the probe so as to constantly transfer the heat from the patient thereto, such area being on the order of 0.001 inch thick. The invention also encompasses bordering said thin area with three or more integrally-formed ribs that radiate therefrom on the inside of the tip in angularly-spaced relation to one another where they cooperate to engage and keep the probe centered therebetween while, at the same time, maintaining minimal heat transfer contact therewith. In the preferred form of the invention these ribs have an essentially triangular cross section with the apex of said rib making line contact with the probe. The invention further encompasses the novel method of molding the cap which includes splitting a single incoming stream of moldable material into two equal streams whose combined flow equals that of said incoming stream, sending said streams around to opposite sides of the mold along paths of substantially equal length preparatory to again splitting each of the two streams into two more streams of equal flow and whose combined flow equals that of the split stream from which they emanate, delivering the four streams thus produced along paths of substantially equal length to four equiangularly-spaced gates entering the mold cavity near the base thereof, merging said streams again within the mold cavity prior to filling the tip therewith, and channeling portions of said merged streams from at least three directions into a localized area within the tip where the gap separating the main mold body from the core inside thereof is of the least thickness.

9 Claims, 10 Drawing Figures

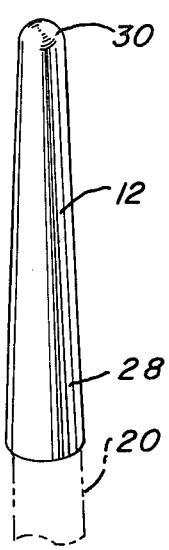
Fig_5
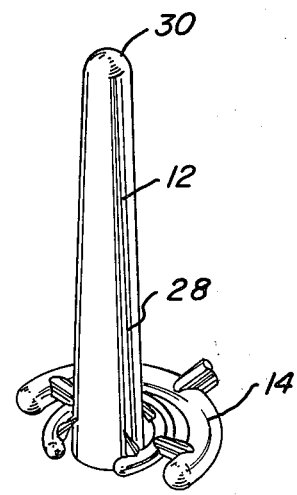
Fig_4
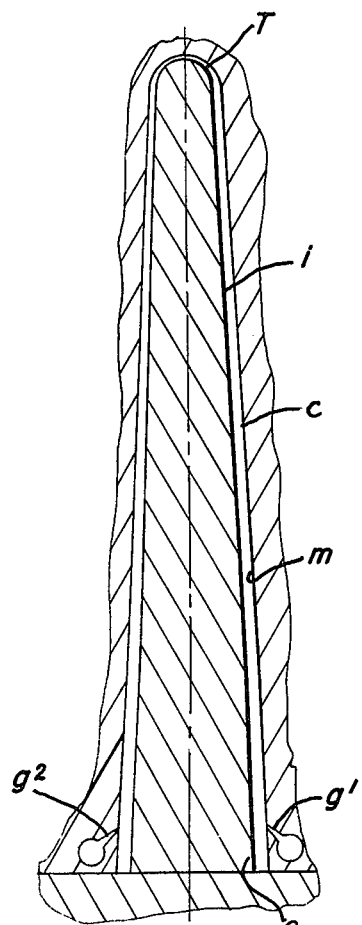
Fig_3
PRIOR ART
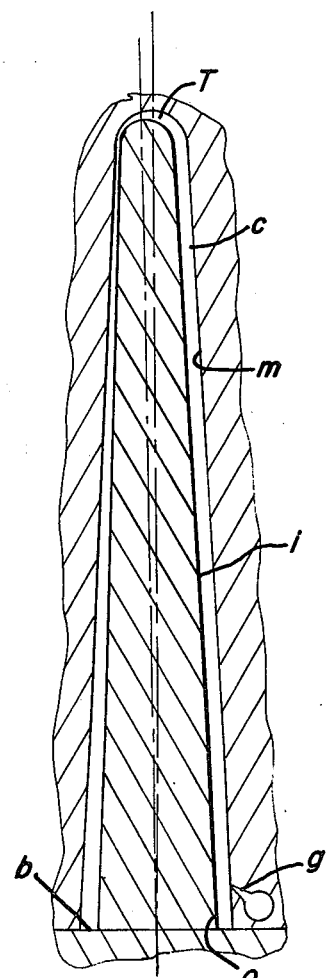
Fig_2
PRIOR ART
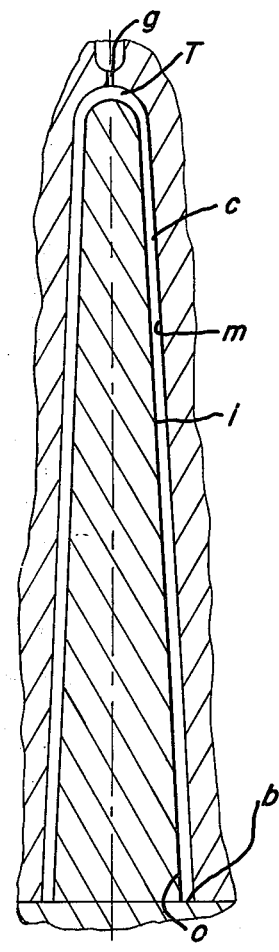
Fig_1
PRIOR ART

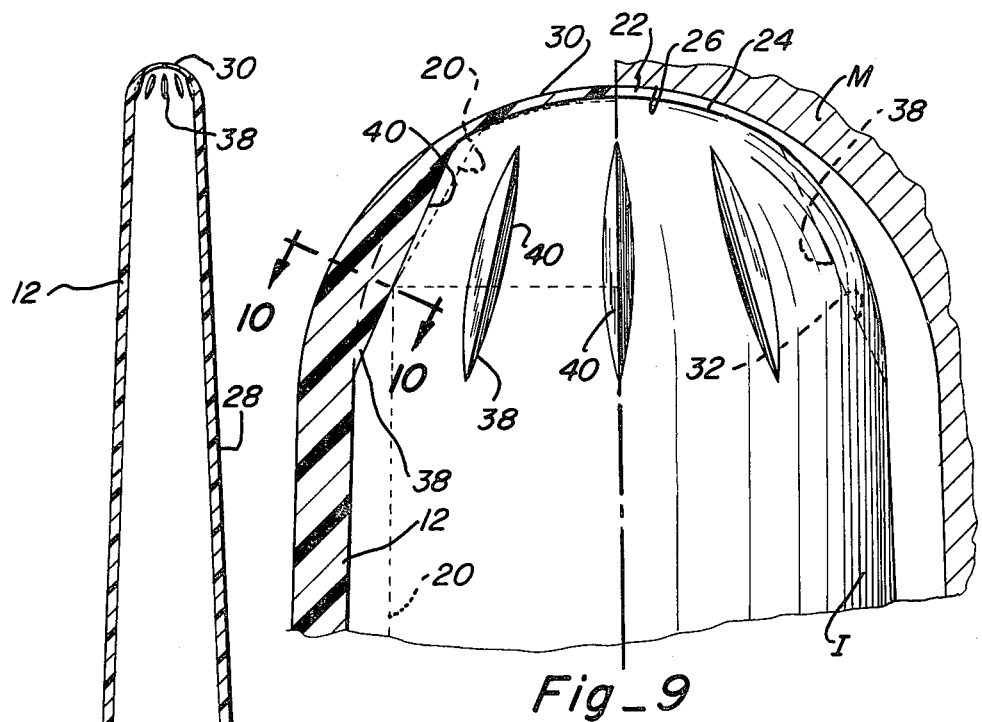
Fig_9
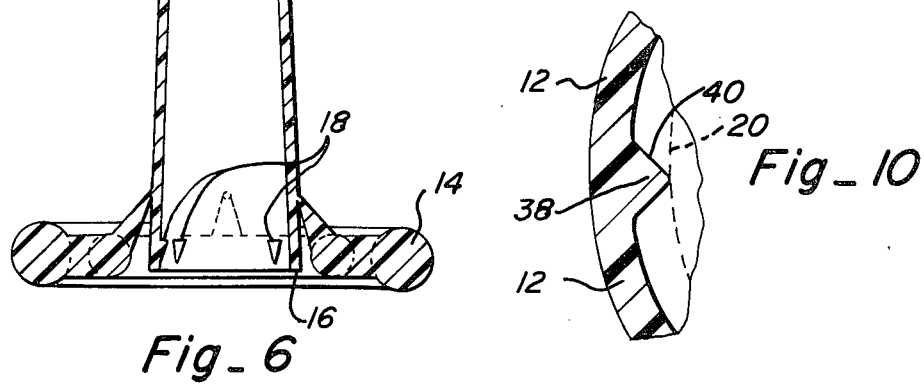
Fig_6   Fig_10
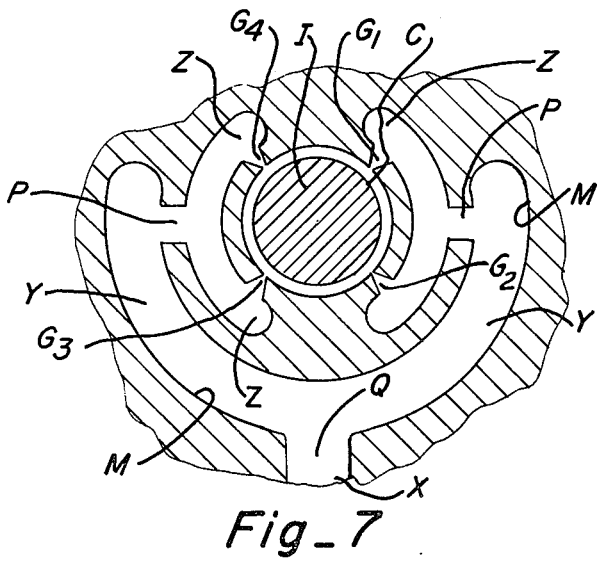
Fig_7
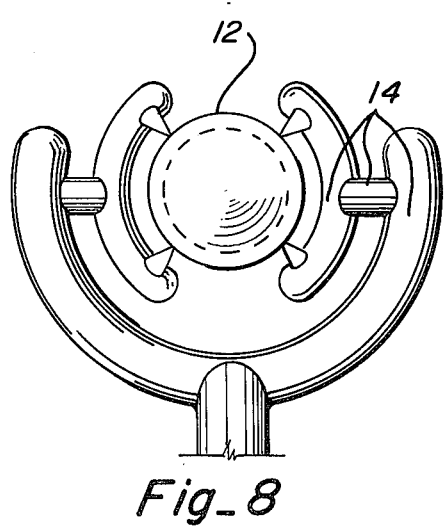
Fig_8

DISPOSABLE THERMOMETER CAP AND METHOD OF MAKING SAME

Most modern hospitals, other health care facilities and even doctors' offices have done away with the traditional mercury-filled glass thermometers and have replaced them with electronic units which employ a heat-responsive probe containing a sensing element in the form of a thermocouple that functions to produce a visual display, usually in digital form, of the patient's temperature. These devices either use a self-contained rechargeable power supply or an external power supply available in the areas where the thermometer is used.

The thermometer itself is an expensive piece of electronic equipment which, for obvious reasons must be reused over and over again. Moreover, the design and construction of these units is such that they cannot be sterilized easily between uses. The sterilization temperatures and environment are such that the electronic components could easily become damaged or at least cease to function as intended. Sealing out all moisture becomes a problem as does the elimination of all joints, pockets and other sites on the exterior of the case where contaminants could collect. In any event, the electronic thermometer manufacturers have chosen to cover the probe with a sterile disposable single-use cap rather than attempt to design and construct a sterilizable thermometer. Unfortunately, these caps leave much to be desired in that they materially lessen the effectiveness of the thermometer for its intended purpose, namely, that of quickly and accurately providing a reading of the patient's temperature.

The problems associated with the prior art caps, while complex, all basically involve efficient heat transfer to the thermocouple of the probe. In fact, the heat transfer is so poor through the prior art caps that rather than wait the approximately two minutes or so it takes for the thermometer to actually reach the temperature inside the patient's mouth, a reading is taken well in advance of this final reaching and extrapolated electronically to the end point along a predetermined temperature curve. Saying this more simply, if, for example the actual temperature of the probe in twenty seconds was 88° F., the indicated temperature might be 102.5° F. because previously determined time temperature curves showed this relationship to exist. Obviously, there are certain inaccuracies inherent in such a system, yet, if one waits until the temperature of the probe actually reaches the temperature inside the patient's mouth, so much time will have elapsed that use of the electronic thermometer has nothing of significance to offer over the conventional mercury-filled glass ones.

Seemingly, therefore, the answer lies in more efficient heat transfer from the patient's mouth to the thermocouple in the probe. Metal caps or metal-tipped plastic caps offer an obvious answer; however, a full metal cap is far too expensive to be practical as is the combination metal and plastic one which, while less expensive to make, involves a costly assembly operation. Manufacturing costs of less than a cent apiece must be realized if the product is to reach the consumer at a realistic price of around a nickel because there remain expensive sterilization and sterile packaging operations to be performed in addition to the normal marketing expenses.

Another possible solution is to design some type of inexpensive all plastic cap having heat transfer capabilities close to that of a metal cap or a metal-tipped plastic one. So far, while this has been the approach most manufacturers have taken, it has proven to be singularly unsuccessful. There are several reasons for this, most of which have to do with the design of the caps and the methods by which they are molded. Regardless of the cause, the result has been that the tip of the cap which covers the thermocouple has ended up being quite thick. At least this is true of the rigid molded plastic caps which are the only kind in widespread use for this purpose, the thinnest being of the order of 0.01 inches thick. Heat transfer through a molded plastic wall of such a dimension is very slow to say the least. Add to this the problem that a good deal of the heat is conducted to insensitive areas of the probe through walls of the cap remote from the thermocouple in contact therewith and one gets some appreciation of the problem.

It has now been found in accordance with the teaching of the instant invention that these and other shortcomings of the prior art disposable probe caps can in large measure be overcome by the simple, yet unobvious, expedient of molding a cap with a highly localized area in the tip which is of the order of 0.001 inches thick and surrounding same with a series of three or more angularly-spaced inwardly projecting ribs that radiate therefrom and cooperate to maintain at least that area of the cap that is placed within the patient's mouth in minimal contact with the probe except where the thin area contacts the thermocouple. The slots in the core of the mold that produce the ribs perform the exceedingly important function during the molding operation of channeling the plastic molding material migrating along the core from the four equiangularly-spaced gates at the hose thereof into the tip section so as to produce the thin area essential for fast and efficient heat transfer to the thermocouple of the probe. The novel technique by which four balanced streams of plastic molding material simultaneously enter the base of the mold, flow around the core and join together as they migrate therealong toward the tip section is also believed to be unique and comprises the only way known to applicant for reliably producing the thin area in the tip while, at the same time, maintaining an equal pressure around the mold core so as to not tilt it within the mold cavity and produce sidewalls of unequal thickness and, perhaps, even create holes where the core touches the mold.

It is, therefore, the principal object of the present invention to provide a novel and improved disposable molded plastic cap for covering the heat sensitive probe of electronic thermometers.

A second objective of the within described invention is to provide a unique method of molding the cap which comprises simultaneous introducing four balanced streams of molding material into the mold cavity at equiangularly-spaced points around the base of the core.

Another object is to provide a device of the type aforementioned which is thinner in the critical area covering the thermocouple of the probe by a several fold factor over that of the best that the prior art has yet produced in a rigid cap.

Still another objective is the provision of a novel method of forming the cap which enables a localized thin area in the tip of the cap to be produced and reproduced reliably even in a multi-cavity mold.

An additional object is to provide the tip of the cap with rib-like projections which are so designed and located relative to one another that they cooperate to maintain the probe centered therebetween and in minimal heat exchange relation except for that highly localized thin area covering the thermocouple where fast efficient heat transfer is most needed.

Further objects are to provide a cap for electronic thermometers which is simple to make, inexpensive, uniform, reliable, easy to sterilize, compact, lightweight, tasteless, non-toxic, and a unit that is readily adaptable for use with any of the commercially available thermometers with only minor modification.

Other objects will be in part apparent and in part pointed out specifically hereinafter in connection with the description of the drawings that follows, and in which:

FIG. 1 is a diagram illustrating the accepted prior art method for molding long thin plastic caps of the type forming the subject matter hereof which calls for the plastic molding material to enter the mold cavity at the tip of the core;

FIG. 2 is a diagram like FIG. 1 illustrating a second prior art molding method wherein the molding material is introduced into the mold cavity in a single stream at the base of the core;

FIG. 3 is still another diagram like that of FIGS. 1 and 2 showing what occurs when one introduces two streams of material into the mold cavity at the base of the core but at diametrically disposed points on opposite sides thereof and without channeling material into the tip area;

FIG. 4 is a perspective view to a reduced scale showing the molded cap as it leaves the mold prior to its being trimmed;

FIG. 5 is a perspective view similar to FIG. 4 and to the same scale showing the cap trimmed and ready for use, the thermometer probe having been indicated in phantom lines;

FIG. 6 is a diametrical section to the same scale as FIGS. 1–3 showing the molded plastic cap in the present invention in its untrimmed form as it leaves the mold after having been molded in accordance with the unique molding method that also forms the subject matter hereof;

FIG. 7 is a horizontal section through the base of the mold and insert therefor showing the manifolding into the mold cavity;

FIG. 8 is a plan view looking down on top of the untrimmed cap of FIG. 6;

FIG. 9 is still a further enlarged fragmentary diametrical section showing the right half of the mold and core thereof together with the whole tip of the cap, portions of the latter having been broken away; and, FIG. 10 is a fragmentary section even further enlarged taken along line 10—10 of FIG. 9 showing one of the ribs in cross section.

Referring next to the drawings for a detailed description of the present invention and, initially, to FIG. 1 for this purpose, the latter represents the traditional method of injection molding elongate thin walled caps. The plastic material is forced under high pressure into the mold at the portion thereof where the closed end or tip T will be formed as indicated by the letter $g$ which stands for "gate." As the plastic enters the mold cavity $c$ defined between the hollowed-out main body of the mold $m$ and the core or insert $i$, it will flow down alongside the latter until it reaches the base of the mold $b$.

The plastic material will thus have filled cavity $c$ and produced the desired tapered cap closed at one end.

Such a method is old in the art and widely employed for elongate thin walled caps and spouts such as those that are used on dispensers for liquid adhesives and the like. Unfortunately, they produce a cap which is highly unsatisfactory because it is the thickest adjacent gate $g$ which is directly above the "thermistor of the thermometer probe" where it should be the thinnest. By introducing the material into the tip area of the mold, provision must be made for a sufficient volume to enter so that it will migrate all the way to the base $b$ and this results in the mold cavity $c$ being quite wide adjacent gate $g$ as shown.

One effort to overcome this problem has been illustrated in FIG. 2, again labeled "PRIOR ART" to which reference will now be made. Here the gate $g$ into the mold cavity $c$ has been moved to the base $b$ of the mold from the tip thereof. By so doing, the space separating the tip of the insert $i$ from the top of the mold $m$ can be made somewhat narrower thus resulting in a thinner tip section T in the finished workpiece. The reason this becomes possible is, of course, that the portion of the mold cavity $c$ at the tip of the insert need no longer be oversized to accommodate the material entering through a gate in this position, but instead, the greater volume needs to be near the base $b$ of the mold where the gate has been relocated. Unfortunately, the arrangement of FIG. 2 while solving one problem has created certain others that are equally serious if not more so.

The most significant of these problems is the deflection of the core or insert $i$ as the molding material impinges thereagainst. As illustrated, in FIG. 2, the top of the insert has moved to the left under the influence of the sidewise pressure exerted on the right side thereof as the molding material enters single gate $g$. This molding material will, obviously, fill the cavity $c$ on the side adjacent the gate $g$ before it migrates around to the opposite side thus creating this very substantial deflection force. The net result is to produce a workpiece having a non-uniform cross sectional wall thickness which becomes progressively worse from the open lower end $o$ upward toward the tip T. In fact, this deflection can, and often does, become so gross that the core or insert $i$ actually comes into contact with the wall of the mold $m$ thus producing a hole in the workpiece.

The last of the prior art illustrations is that forming the subject matter of FIG. 3 to which reference will now be made. In FIG. 3, two gates, $g_1$ and $g_2$ have been placed in the base of the mold $m$ with the purpose in mind of introducing material at diametrically opposed points on opposite sides of the core or insert $c$ so as to minimize the unequal loading of the latter. As such, the scheme of FIG. 3 constitutes an attempt to solve the problems inherent in the molding technique of FIG. 2. While some improvement is possible, certain problems still remain unsolved.

If, for instance, the same amount of material at the same pressure does not enter both gates $g_1$ and $g_2$ at precisely the same instant, an unbalanced condition will exist that tends to deflect the core the same way as the core in FIG. 2 albeit to a lesser degree due to a smaller differential. Secondly, there is nothing to prevent the core from deflecting in a direction at right angles to the plane of the two gates, i.e., toward or away from the viewer looking at FIG. 3.

Even more important than these, however, is the common problem present in both the prior art molding methods shown in FIGS. 2 and 3 and that is the necessity for leaving a certain minimum gap in the mold cavity in critical area T to insure that the plastic material will enter and fill same completely. It appears that a minimum gap in the order of 0.01 inches is required to insure that area T will be completely filled under ordinary injection molding techniques while using conventional materials. Unfortunately, this is still far too thick for best results.

Still another proposed solution to the problem should be mentioned briefly even though it has not been illustrated and that is the use of an elastic balloon-like membrane of some type that is stretched over the tip of the thermometer probe and releasably secured to the base thereof. As far as the thickness of the membrane in the area of the heat sensor or thermistor is concerned, no injection molded part can be made nearly as thin. There are problems, however, and they are quite serious ones. To begin with, it becomes very difficult for the nurse or other user to install such a membrane over the probe without contaminating it as it must, under most circumstances, be handled a good deal in performing this operation. Secondly, the "wet noodle-like" consistency of the membrane is such that it does not admit readily to automatic packaging and sterilization. Finally, the very nature of the article renders it susceptible to pin hole imperfections which open up when stretched over the probe and thus provide an avenue for bacterial contamination and the like. While it is possible to test for these and other anomalies, to do so is far too expensive for a single-time use disposable item of this character which must, to be competitive, sell to the hospital for a few cents at most.

The remaining figures of the drawing to which reference will now be made are directed to the novel disposable thermometer cap which has been broadly referred to by numeral 12 and to the unique method of making same. As was the case with the prior art methods illustrated in FIGS. 2 and 3, the cap of the instant invention is molded by injecting the molding material at the base of the mold, however, here is where the similarity ends. For a proper understanding of the molding method, reference will be made initially to FIG. 7 of the drawings where the main mold M has been partially illustrated along with the manifolding by means of which the molding material is introduced into the base of the mold cavity C through four equiangularly-disposed gates $G_1$, $G_2$, $G_3$ and $G_4$. The molding material is forced under pressure into the main passage "X" where it is divided into two streams each carrying half of the total flow of main passage X. These two streams are conducted in opposite directions through branch passages "Y", the cross sections of which are uniform and sized as previously noted to carry half the flow. Located equidistant from the junction "Q" of these branch passages Y with main passage X are two pasages "P" that interconnect said branches Y with two other passages Z. In other words, the passages P are so located relative to junction Q that the molding material flowing within branches Y will simultaneously enter passages Z through passages P. Passages P are preferably located diametrically opposite one another using the axis of the mold insert "I" as a center.

Passage P enter passages Z intermediate the ends thereof as shown so that the flow of molding material in the latter passages will enter the mold cavity C simultaneously through equiangularly-spaced gates $G_1$, $G_2$, $G_3$ and $G_4$. Once again, the passages Z are so sized that they will each carry half the flow of molding material flowing through passages Y. From the foregoing, it is obvious that the manifold in the main die has as its purpose the dividing of the total flow of molding material entering the die into four equal streams which enter the mold cavity C simultaneously at four equiangularly-spaced locations ($G_1$–$G_4$) at the base thereof. By manifolding the mold M in this way, the molding material fills the cavity C by flowing around the core I thereof and applying a balanced fluid pressure thereagainst which maintans it precisely centered, a condition which is difficult if not virtually impossible to attain with either of the prior art "bottom-fed" injection molding methods of either FIGS. 2 or 3.

Next, with reference to FIGS. 4, 6 and 8 of the drawings, it will be seen that the cap 12 emerges from the mold M with the congealed streams 14 representing the manifolding within the mold still attached thereto. It (14), of course, represents excess material which is trimmed away from the cap 12 and reused in the conventional manner. Such surplusage, therefore, has no functional significance and, for this reason, can be disregarded for purposes of the present invention.

In FIG. 9, it will be seen that the core or insert I of the mold assembly has indentations 16 at angularly-spaced points around the base thereof that produce projections 18 which releasably lock beneath an annular rib or the like (not shown) at the base of the thermometer probe 20 (phantom lines in FIG. 5). Snap caps of one type or another are notoriously old in the art as a means for covering necked and spouted containers and no novelty is predicated upon this feature. Furthermore, the projections shown are intended as being merely representative of one type of releasable closure, others being interlocking continuous annular ribs, threads, etc.

Referring next to both FIGS. 6 and 9 and particularly to the right half of FIG. 9 where the mold and core are shown, it will be seen that the gap 22 between the tip 24 of the insert I and the adjacent wall 26 of the mold body is considerably thinner than the thickness of the frusto-conical wall 28. Preferably, the area 30 at the extreme tip of the cap 12 which will ultimately overlie and contact the thermistor (not shown) of the thermometer probe 20 is of the order of 0.001 inches thick or less to insure rapid heat transfer therethrough.

Now, in accordance with the teaching of the prior art bottom-fed injection molding methods including that of FIG. 3, it is not possible to reliably form tip section 30 with a wall thickness much less than say about 0.01 inches, 0.008 being about as thin as has yet been attained. The reason for this is that if gap 22 is less than 0.01 inches or so, the molding material cannot be forced into the tip area with sufficient pressure to fill same completely thus resulting in holes and other imperfections which cannot be tolerated in a sterile cap for a thermometer probe.

It has now been discovered in accordance with the teaching of the instant invention that these and other shortcomings of the prior art borttom-fed injection molding methods can, in large measure at least, be overcome by the simple, yet unobvious, expedient of merely grooving the core or insert as shown at 32 adjacent the tip area 30 and leading into the latter so as to channel sufficient molding material therein to completely, repeatedly and reliably fill gap 22. As the four streams entering the base of the mold cavity through gates $G_1$–$G_4$ merge and rise therein, channels 32 in the core feed it into the narrow gap 22 in the tip area 30 so as to produce a closed end having a wall thickness in the order of 0.001 inches thick which is thinner by a severalfold factor than that which has been realized by any other injection molding technique so far as applicant is aware.

Finally, with reference to FIGS. 6, 9 and 10, it will be noted that the channeling of the insert or core I results in inwardly projecting ribs 38 being produced on the inside of the cap radiating in more or less equiangularly-spaced relation from the thin section 30 thereof. Obviously, molding material could be channeled into narrow gap 22 by grooving the wall of the main mold M bordering the cavity C instead of the insert I; however, to do so has certain disadvantages. To begin with, the ribs 38 would be on the outside of the cap and provide a somewhat rough and abrasive surface that could be uncomfortable to place in the mouth. Be that as it may, the main reason for preferring that the ribs 38 be on the inside of the cap is that they perform certain very useful functions when so located.

First, these ribs cooperate with one another, or at least can be made to do so, such that they engage and maintain the thermometer probe centered within the interior of the cap. This becomes important because it is highly undesirable to have the cap in heat conductive contact with areas of the probe other than that containing the heat sensor or thermistor. In other words, if the heat from the patient's mouth is by passed by the cap to those areas of the probe having no heat sensing capability, the efficiency of the whole unit suffers.

This brings us to the final point most clearly revealed in FIGS. 9 and 10 where it will be seen that all of the ribs 38 have a generally triangular transverse cross section such that they terminate in a sharp ridge 40. By appropriately shaping the tip of the probe as indicated by phantom lines on the left side of FIG. 9, it not only becomes possible to center the latter within the cap but also to maintain multiple point contact therewith. As such, the heat losses through the cap to insensitive areas of the probe are even further minimized. Other than these points where the thermistor rests up snug against the thin section 30 and the ribs make point contact with the probe, the only other area of contact should be at the base when the snap connection is made because this portion of the assembly will usually lie outside the patient's mouth anyway.

What is claimed is:

1. The improved protective cover for the probe of an electronic thermometer of the type having a heat-responsive element in the tip thereof which comprises: a rigid tubular element closed at one end to form a cap, the size of said tube being greater than that of the probe in the area of the tip so as to leave an annular space therebetween, the closed end of said cap having a central thin walled area surrounded by a relatively thicker marginal area bordering same, the interior surface of said marginal area having at least three integrally-formed ribs arranged in angularly-spaced relation and radiating from said thin central area, said ribs being positioned and adapted to cooperate with one another to maintain the probe centered within the tubular element and said thin walled center section in heat conductive contact with the heat-responsive element.

2. The protective cover as set forth in claim 1 in which: the closed end is shaped to form a dome and in which the marginal area between the ribs merges into the tube walls and is approximately the same thickness as the latter.

3. The protective cover as set forth in claim 1 in which: the thin walled central area is less than 0.002 inches thick at the thinnest point therein.

4. The protective cover as set forth in claim 1 in which: the ribs are substantially equiangularly-spaced.

5. The protective cover as set forth in claim 1 in which: the ribs taper inwardly to a narrow edge adapted to make essentially point contact with the tip of the probe alongside the heat-responsive element thereof.

6. The protective cover as set forth in claim 1 in which: the ribs are arched and bridge the juncture between the marginal area at the closed end of the tubular element and the wall of the latter.

7. The protective cover as set forth in claim 1 in which: the ribs terminate at the edge of the thin walled central area.

8. The protective cover as set forth in claim 1 in which: the height of the ribs decreases as they approach the thin walled central area.

9. The protective cover as set forth in claim 3 in which: the thin walled central area is approximately 0.001 inches thick at its thinnest point.

* * * * *